No. 888,546. PATENTED MAY 26, 1908.
H. B. SPERRY.
SIDE DELIVERY HAY RAKE.
APPLICATION FILED DEC. 16, 1907.
3 SHEETS—SHEET 1.
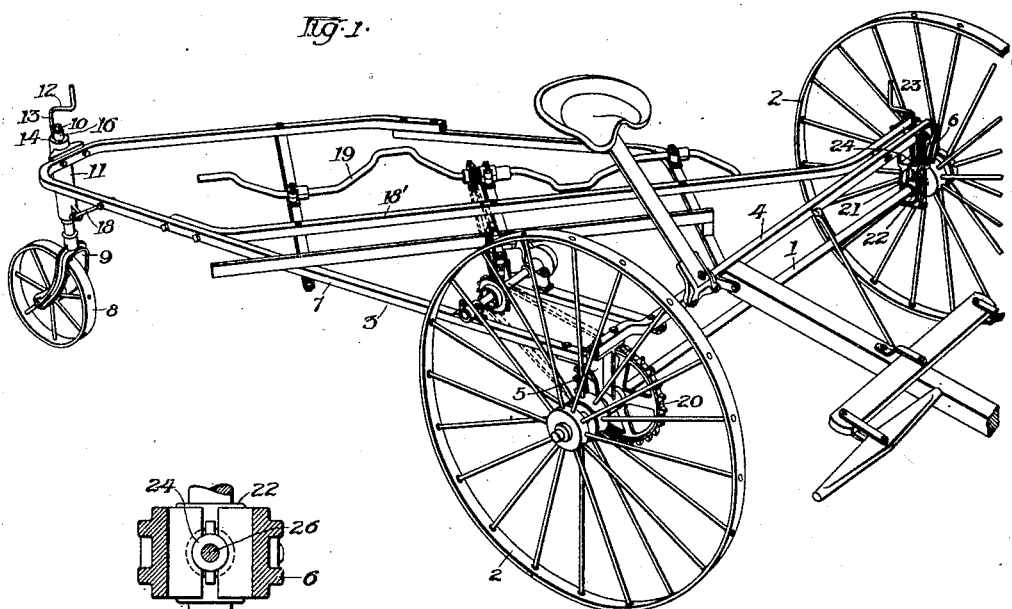
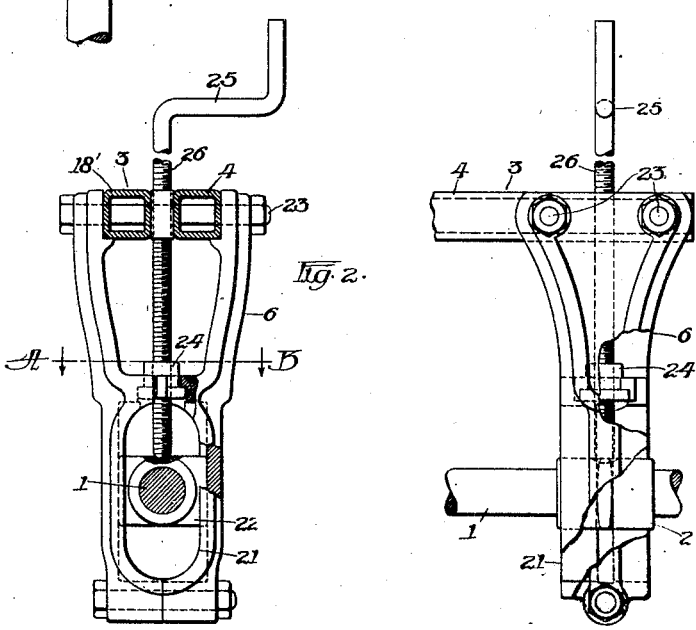
Witnesses:
J. N. Daggett.
F. W. Hoffmeister.
Inventor:
Herbert B. Sperry.
By E. W. Burgess
Attorney No. 888,546. PATENTED MAY 26, 1908.
H. B. SPERRY.
SIDE DELIVERY HAY RAKE.
APPLICATION FILED DEC. 16, 1907.
3 SHEETS—SHEET 2.
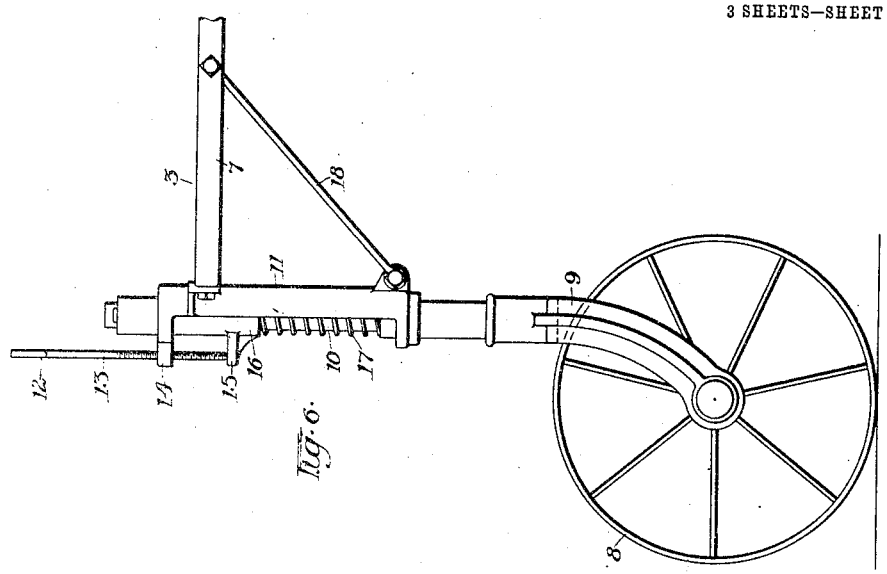
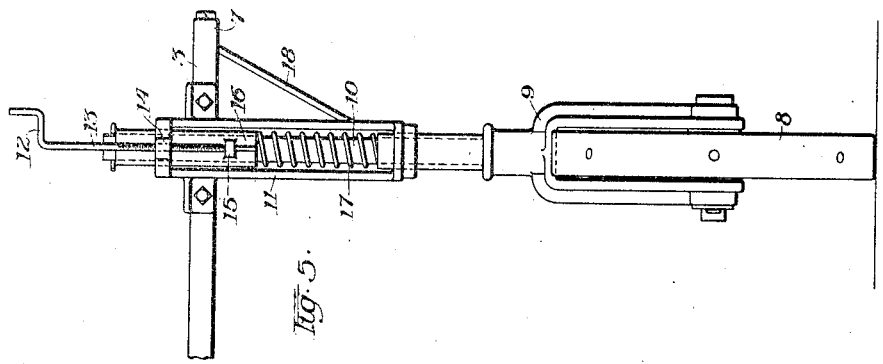
Witnesses:
J. N. Daggett.
F. W. Hoffmeister.
Inventor:
Herbert B. Sperry
By E. W. Burgess
Attorney.

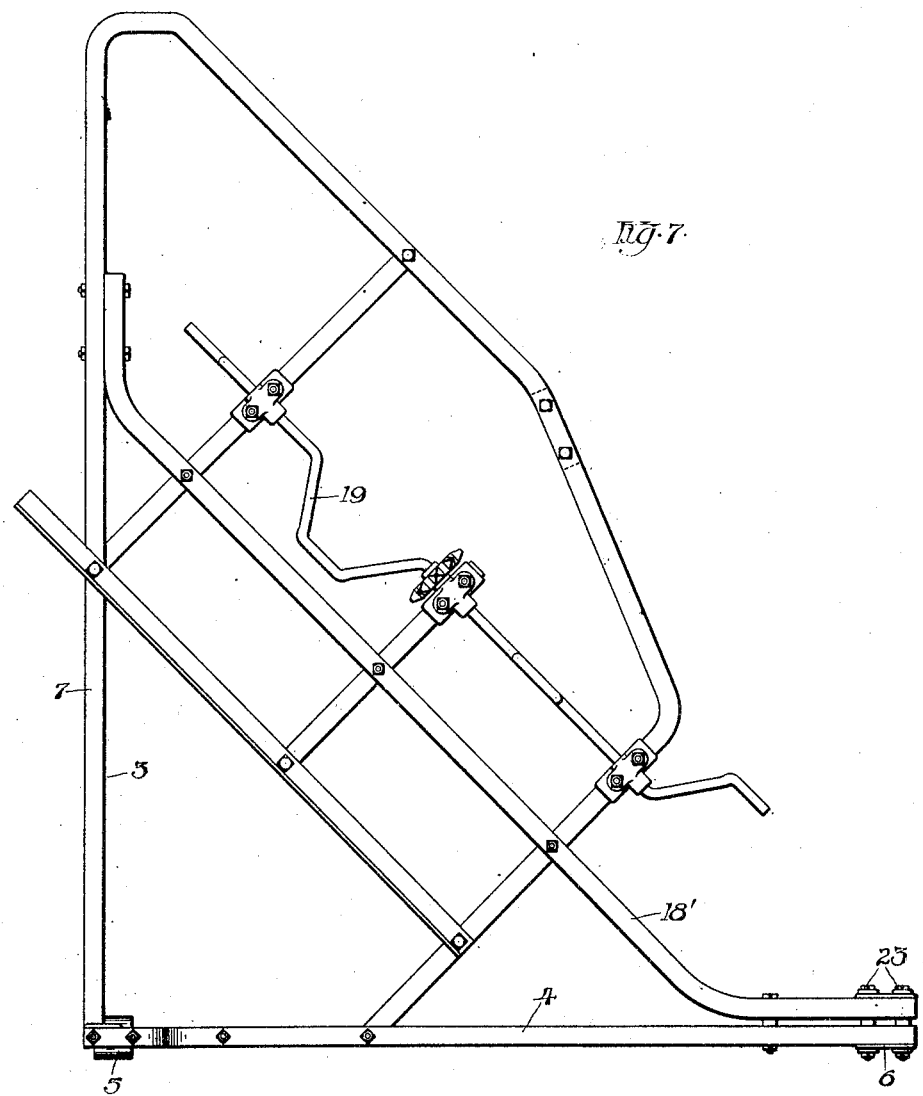

ved by the upper end of sleeve 11, and in which the spindle 10 is journaled; the crank being operative to move the bearing block downward in a manner to raise the frame and against a coiled spring 17 surrounding the spindle and operative to yieldingly press it in a downward direction; and 18 is a brace connected with the lower end of sleeve 11 and the frame member 7, which member extends laterally and forward toward member 4 of the frame, to which it is secured.

UNITED STATES PATENT OFFICE.

HERBERT B. SPERRY, OF OTTUMWA, IOWA, ASSIGNOR TO INTERNATIONAL HARVESTER COMPANY, A CORPORATION OF NEW JERSEY.

SIDE-DELIVERY HAY-RAKE.

No. 888,546.   Specification of Letters Patent.   Patented May 26, 1908.

Application filed December 16, 1907. Serial No. 406,679.

*To all whom it may concern:*

Be it known that I, HERBERT B. SPERRY, a citizen of the United States, residing at Ottumwa, in the county of Wapello and State of Iowa, have made certain new and useful Improvements in Side-Delivery Hay-Rakes, of which the following is a specification.

My invention relates to side delivery hay rakes, and is applicable in particular to that type of such machines in which a triangular frame is supported at its forward side upon an axle having carrying wheels mounted thereon, the rear end of the frame being supported by a caster wheel and in which a rotatable rake operating member is mounted upon the frame in rear of the axle and diagonally arranged relative to the line of draft of the machine; its object being to provide means whereby the frame may be adjusted toward or from the ground along the axis of the rake operating member. I attain this object by the mechanism illustrated by the accompanying drawing, in which—

Figure 1 is a perspective view of a part of a rake of the character described and having my invention embodied therein. Fig. 2 is a detached detail, partly in section, of a portion of the frame adjusting means. Fig. 3 is a side elevation of Fig. 2. Fig. 4 is a cross section of Fig. 2 on line A—B. Fig. 5 is an elevation of the caster wheel mechanism; and Fig. 6 is a side elevation of Fig. 5. Fig. 7 represents a plan view of the rake operating member and the diagonal side of the triangular frame.

Referring to the drawings, in which the same reference numerals denote like parts through the several views, 1 is the main axle of the machine having carrying wheels 2 mounted at opposite ends thereof.

3 represents a triangular frame having a forward side member 4 supported by the axle at opposite ends thereof by means of brackets 5 and 6; and 7 is a frame member having its forward end secured to bracket 5 and extending rearward at right angles with the axle is supported by a caster wheel 8, which is journaled in a fork 9; the fork being secured to a vertical spindle 10 that is rotatably and slidably received by a sleeve 11, secured to the frame member 7; and 12 represents a crank having one arm 13 threaded and received by a nut 14 integral with the upper end of the sleeve and having its lower end contacting with an ear portion 15 of a bearing block 16, slidably received by the upper end of sleeve 11, and in which the spindle 10 is journaled; the crank being operative to move the bearing block downward in a manner to raise the frame and against a coiled spring 17 surrounding the spindle and operative to yieldingly press it in a downward direction; and 18 is a brace connected with the lower end of sleeve 11 and the frame member 7, which member extends laterally and forward toward member 4 of the frame, to which it is secured.

18¹ is a supplemental frame member having one end secured to frame member 7 forward of the caster wheel and extending across the triangular frame has its opposite end secured to bracket 6 and the frame member 4.

19 is a multiple crank-shaft rotatably mounted upon the triangular frame and arranged diagonally relative to the line of advance of the machine, and with which may be connected a series of rakes in a common manner, the rakes not being shown.

Motion is transmitted from the axle to shaft 19 by means of a sprocket wheel 20 secured to the axle and other means mounted upon the frame and crank-shaft, respectively.

The bracket 6 is provided with an elongated slot 21 at its lower end, and a slidably mounted therein is a bearing block 22 having the axle journaled therein. The upper end of the bracket embraces the frame members 4 and 18¹, and is secured thereto by means of the bolts 23. A nut 24 is supported by the bracket intermediate the bearing block and its upper end, and 25 represents a crank having one arm 26 threaded in a manner to engage with the nut 24; the lower end of the crank contacting with the bearing block 22, whereby a turning movement of the crank will cause the bracket and connected frame members to move vertically in relation to the axle and thereby adjust the frame vertically along the axis of the multiple-crank rake operating member, and by means of the adjusting mechanism connected with the caster wheel the opposite corner of the triangular frame may be raised or lowered in a like manner.

What I claim as my invention, and desire to secure by Letters Patent, is:

1. In a side delivery hay-rake, the combination of a supporting axle and carrying wheels mounted thereon, a triangular frame having one of its sides supported by said axle at opposite ends thereof, a second side extending rearward of said axle at substantially right angles therewith and having its rear end supported by means of a caster-wheel, a rotatable rake operating member mounted upon said frame and arranged diagonally relative to the line of draft of the machine and substantially parallel with its remaining side, and means for adjusting said frame vertically along the axis of said rotatable rake member.

2. In a side delivery hay-rake, the combination of a supporting axle and carrying wheels mounted thereon, a triangular frame having one of its sides supported by said axle at opposite ends thereof, a second side extending rearward of said axle at substantially right angles therewith and having its rear end supported by means of a caster-wheel, means for adjusting said frame vertically relative to said caster-wheel, a rotatable rake operating member mounted upon said frame and arranged diagonally relative to the line of draft of the machine and substantially parallel with the remaining side, and means connecting the forward end of said remaining side with said axle whereby it may be adjusted vertically in relation thereto.

3. In a side delivery hay-rake, the combination of a supporting axle and carrying wheels mounted thereon, a triangular frame having one of its side members supported by said axle at opposite ends thereof, a rotatable rake operating member mounted upon said frame in rear of said axle and arranged diagonally relative to the line of draft of the machine, motion transmitting mechanism connecting one end of said axle with said rotatable member, and means whereby the distance between the opposite end of said axle and said frame member may be varied.

4. In a side delivery hay-rake the combination of a supporting axle and carrying wheels mounted thereon, a triangular frame having one of its side members supported by said axle at opposite ends thereof, a rotatable rake operating member mounted upon said frame in rear of said axle, motion transmitting mechanism connecting one end of said axle with said rotatable member, and means whereby the distance between the opposite end of said axle and said frame member may be varied, said means comprising a bracket secured to said frame member and having a vertically arranged slotted portion, a bearing block slidably mounted in said slotted portion and having said axle journaled therein, a nut supported by said bracket, a crank supported by said bracket and having one of its arms in contact with said bearing block, said arm being threaded and received by said nut.

HERBERT B. SPERRY.

Witnesses:
M. C. GILMORE,
PRICE GOODSON.